Figure 3:
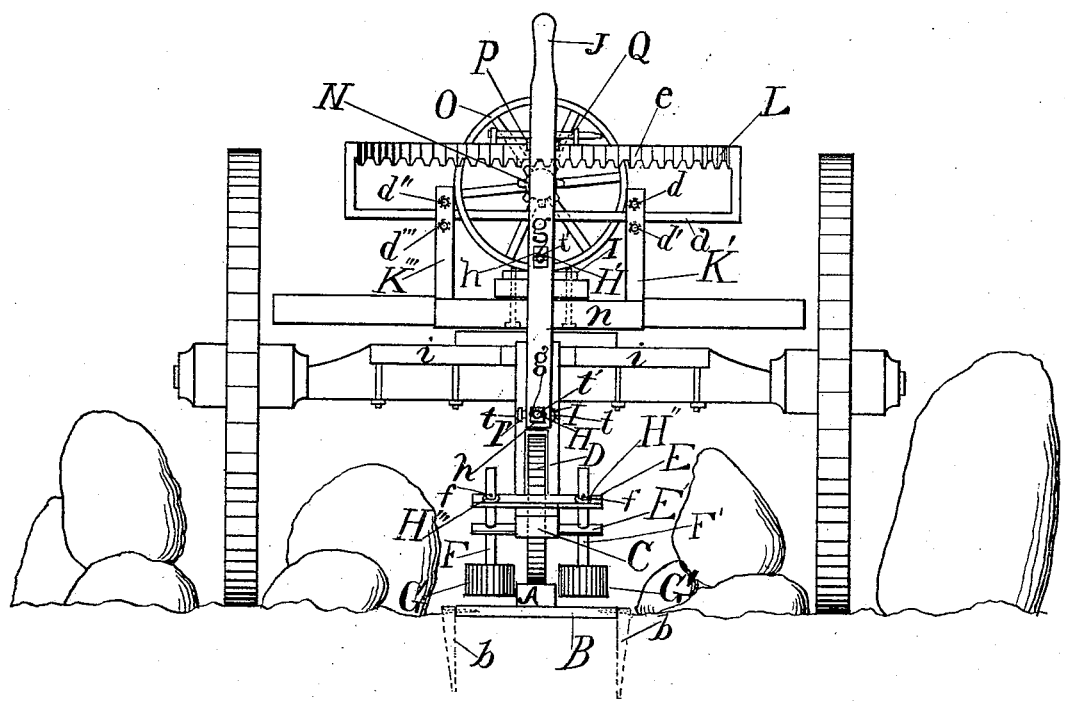

(No Model.) 2 Sheets—Sheet 1.
J. B. OSBORNE.
TRACTION WAGON STEERING APPARATUS.
No. 465,491. Patented Dec. 22, 1891.
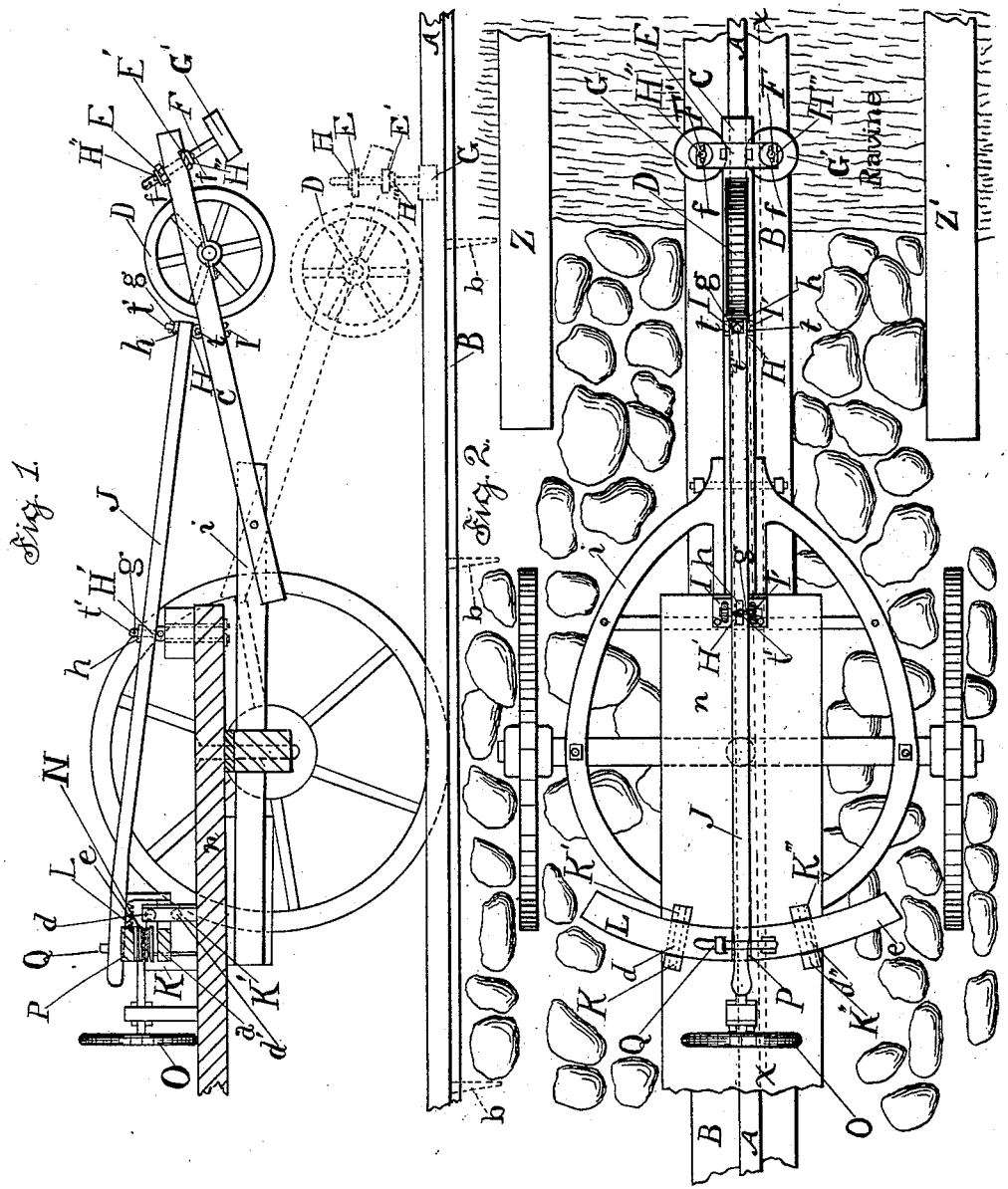
Witnesses
M. C. Galen
F. M. Townsend.
Inventor
Jonas Brown Osborne
by Hazard & Townsend
his att'ys.

(No Model.) 2 Sheets—Sheet 2.
J. B. OSBORNE.
TRACTION WAGON STEERING APPARATUS.

No. 465,491. Patented Dec. 22, 1891.

Witnesses
M. C. Galer.
F. M. Townsend.

Inventor
James Brown Osborne
by
Hazard Townsend
his atty.

UNITED STATES PATENT OFFICE.

JONAS B. OSBORNE, OF DAGGETT, CALIFORNIA.

TRACTION-WAGON-STEERING APPARATUS.

SPECIFICATION forming part of Letters Patent No. 465,491, dated December 22, 1891.

Application filed November 29, 1890. Serial No. 373,038. (No model.)

*To all whom it may concern:*

Be it known that I, JONAS BROWN OSBORNE, a citizen of the United States, residing at Daggett, in the county of San Bernardino and State of California, have invented a new and useful Improvement in Traction - Wagon - Steering Apparatus, of which the following is a specification.

My invention is of special advantage in mountainous, desert, and unsettled districts, where it frequently occurs that many miles of roadway have to be constructed through bowlders, sand, and forest and over ravines and ridges in order to reach a single mining or lumber camp.

The primary object of my invention is to reduce the cost of preparing such roadways and the expense of operating traction wagons thereon.

A further object of my invention is to provide steering apparatus for traction wagons which will be automatic in its operation in following the prepared roadway and which is so arranged and constructed that it can be instantly converted into a hand steering apparatus to be used independent of the prepared roadway.

A further object is to provide means for guiding a train of wagons automatically, so that each wagon shall follow exactly in the tread of the one preceding it, thus keeping the track smooth and solid and preventing the loss of power which occurs where each separate wheel is made to break all or a portion of its own track.

It is obvious various devices may be arranged to connect the axle with the guiding-rail, and I do not wish to be strictly limited in my claim to any specific device for this purpose; but the accompanying drawings illustrate mechanism invented by me for this purpose, and which is so arranged as to enable the operator to easily place the guiding apparatus under control independent of the guide-rail. This mechanism comprises a pivoted tongue arranged to allow the vertical adjustment of its front end, and provided at such front end with suitable running mechanism, preferably a supporting or bearing wheel, and two axially vertical lateral guides, preferably rollers, arranged, respectively, to engage the top and sides of the guide-rail; a pivoted lever pivoted by a universal joint to the tongue near its front end and fulcrumed upon the wagon; an arc rack secured to the bed of the wagon and arranged to allow lateral movement; mechanism arranged to operate the arc rack laterally, the same preferably consisting of a pinion connected with a hand-wheel or other suitable operating mechanism, and means for securing the rear end of the lever to and releasing it from the arc rack.

Back of the bearing-wheel D the front end of the tiller-lever is secured to the tongue by a universal joint H, which is formed of an inverted T, secured to the tongue by suitable clips I I', passing over the arms $t\ t$ of the T and secured to the tongue. The stem $t'$ of the T passes through the tiller-lever J, which is secured against removal by means of a pin $g$, bearing upon a suitable washer or plate $h$.

The tongue C is secured to the front axle of the wagon by means of hounds in the usual manner. The front end of the body $n$ of the wagon - bed is reduced in width to about eighteen inches a short distance back of the wheels, and the wagon-box (not shown) ends at the point where the body is so reduced. The reduced portion of the bottom or body $n$ extends forward over the hounds $i$ about eighteen inches beyond the front axle and forms the platform for the hand steering mechanism, and also prevents cramping of the wagon in turning.

By my invention I am enabled to produce a smooth hard road through sand and rocks by simply picking the rocks out of the tread of the wheels and laying the guiding-rail in position between the tracks thus formed, (either removing the rocks, which might interfere with placing the rail, or placing the rail above such rocks sufficiently low to allow the passage of the wagon over the top of the rail,) and then operating the wagons over the track. In case large rocks occur between the tracks a place for the rail may be prepared by blasting the tops off of such rocks.

It will be understood that the changes in the grade of the guide-rail must not be too abrupt.

By this invention it also becomes possible to dispense with the usual flooring for the bridges over streams and ravines and to guide a train of wagons in perfect safety across a bridge formed of two sills, as $z\ z'$, placed to correspond with the tread of the wheels. Such sill should be somewhat wider than the tread of the wagon-wheels, and another sill may be provided in the center to support the guiding-rail; or the guide-rail can be supported on cross-timbers attached to the side sills, if desired. This will be easily understood and is not illustrated.

Reference is had to the drawings for further explanation. Figure 1 is a vertical longitudinal section of the front part of a wagon provided with my invention. $x\ x$, Fig. 2, suggest the line of section. Fig. 2 is a top view of the front part of the wagon with my invention attached. This view also suggests a road with rocks outside and inside of the tread of the wagon-wheels, and also one side of a ravine with bridge. Fig. 3 is a front view of the front part of a wagon with my invention attached, showing the steering mechanism in engagement with the guiding-rail and also suggesting rocks between rail and wheels and outside of the tread of the wheels.

The guiding-rail A is formed of wood and is preferably about two by four inches in cross-section, and is secured to the ground-board B along the mid-line thereof. Such board forms the bed for said rail, and is fastened to the earth by suitable means to secure rigidity in the rail, as suggested by the stakes $b$. The tongue C is provided at its end with a bearing-wheel D, which runs upon the top of the guiding-rail A and supports the tongue and guiding mechanism. Next to the end of the tongue and in front of the bearing-wheel two plates E E' are secured, one on the top of the tongue and one underneath the tongue, and through these plates pass shafts F F', upon the lower ends of which are journaled the guiding wheels or rollers G G'. The said shafts are also provided with adjustable collars H'' H''' on the lower side of plate E' and the upper side of plate E, so that said rods will be journaled to the plates and can be raised or lowered to adjust the wheels G G' to proper height. These collars are held in position by keys $f$ or other suitable devices. The distance between the guiding-wheels is such as to allow of their free movement along the rail without unnecessary friction.

The tiller-lever is pivoted upon the front of the wagon-body $n$ by a universal joint H', constructed and arranged the same as the joint H. Back of the pivotal point of the lever I mount the arc rack L, which forms the arc of a circle having the tiller-pivot H' for center. It is provided with the base or running member $a$, which is held in longitudinal position by rollers $d\ d'\ d''\ d'''$, secured to the wagon by means of posts K K' K'' K''' and arranged to allow lateral horizontal movement of the racks. The upper member $e$ of the rack is provided with teeth, which mesh with a pinion N, controlled by a hand-wheel O. The top of the arc rack is provided in the center with a gain P, adapted to receive the end of the lever J, and is also provided with a clamp Q, adapted to hold the lever in said gain when so desired.

The operation is as follows: The road-bed having been prepared by removing obstructions from along the paths the wagon-wheels are to travel, the guiding-rail is fixed in position between such paths. The wagon is placed with its wheels in the paths and the tongue is lowered to engage the guide-rail, its bearing-wheel D resting upon the top of the guiding-rail and the guiding-rollers G G' embracing the rail between them, as shown in Fig. 3. The wagon is then started, and the guiding-wheels G G', engaging with the sides of the guide-rail A, automatically guide the end of the tongue C along directly over guiding-rail A, and so guide the wagon in the desired track. If desirable, the bearing and guiding wheels may be covered with rubber or other material. When it is desired to leave the track, the front end of the wagon-tongue, with its guiding mechanism, is raised from the guiding-rail by depressing the top end of lever J until it rests in the gain P of the arc rack L, and is then there secured by the clamp Q. The operator then manipulates the hand-wheel O to turn the tongue to the right or left, as he may desire. The cog-wheel or pinion N, engaging with the teeth of the arc rack L, actuates said rack, which, actuating the lever J, moves the front end of the wagon-tongue to the right or left, and so guides the wagon obedient to the will of the operator.

Now, having described my invention, what I claim as new, and desire to secure by Letters Patent, is—

1. The combination of a roadway provided with a guiding-rail, a wagon, its tongue provided at its front end with a bearing-wheel, and the lateral guides arranged to engage the sides of such rail.

2. In a traction-wagon-steering apparatus, the combination of the wagon, the pivoted tongue, the pivoted tiller-lever pivoted to such tongue, the wagon-body provided with an arc rack arranged to allow lateral movement, means for securing said lever to said arc rack, and means for moving said arc rack laterally.

3. In a traction-wagon-steering apparatus, the combination of the wagon, the tongue provided with a bearing-wheel and two lateral guiding-wheels, and a roadway provided with a central guiding-rail.

J. B. OSBORNE.

Witnesses:
JAMES R. TOWNSEND,
JOHN A. JOHNSON,
JAMES A. PARKER.